(12) United States Patent
Fujita et al.

(10) Patent No.: US 11,216,064 B2
(45) Date of Patent: Jan. 4, 2022

(54) NON-TRANSITORY COMPUTER-READABLE STORAGE MEDIUM, DISPLAY CONTROL METHOD, AND DISPLAY CONTROL APPARATUS

(71) Applicant: FUJITSU LIMITED, Kawasaki (JP)

(72) Inventors: Yoshihide Fujita, Kawasaki (JP);
Akinori Taguchi, Kawasaki (JP);
Koichiro Niinuma, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 26 days.

(21) Appl. No.: 16/136,353

(22) Filed: Sep. 20, 2018

(65) Prior Publication Data
US 2019/0094962 A1 Mar. 28, 2019

(30) Foreign Application Priority Data
Sep. 26, 2017 (JP) .............................. JP2017-185383

(51) Int. Cl.
*G06F 3/01* (2006.01)
(52) U.S. Cl.
CPC .................................... *G06F 3/013* (2013.01)
(58) Field of Classification Search
None
See application file for complete search history.

(56) References Cited

U.S. PATENT DOCUMENTS 9,965,860 B2 * 5/2018 Nguyen ............. G06K 9/00597
10,231,614 B2 * 3/2019 Krueger ................. A61B 5/163
2015/0154461 A1 6/2015 Kitaura et al.
2015/0364140 A1 * 12/2015 Thorn ..................... G06F 3/013
704/235
2016/0291690 A1 * 10/2016 Thorn ..................... H04N 5/232
2016/0301862 A1 * 10/2016 Rantakokko ............ G06F 3/011

(Continued)

FOREIGN PATENT DOCUMENTS

JP 11-282617 A 10/1999
JP 2011-138421 A 7/2011
JP 2013-80365 A 5/2013

(Continued)

OTHER PUBLICATIONS

Japanese Office Action dated Mar. 23, 2021 for corresponding Japanese Patent Application No. 2017-185383, with English Translation, 9 pages.

(Continued)

*Primary Examiner* — Andre L Matthews
(74) *Attorney, Agent, or Firm* — Fujitsu Patent Center

(57) ABSTRACT

A non-transitory computer-readable storage medium storing a program that causes a computer to execute a process, the process including obtaining gaze data that indicates a position of a gaze of a user at each of a plurality of times, determining a first movement regarding the gaze of the user based on the gaze data, displaying, on a screen of a display device, gaze information indicating a position of the gaze at each of a plurality of times from a time at which a second movement occurs when the first movement includes the second movement, and displaying, on the screen, gaze information indicating a position of the gaze at each of a plurality of times during a specified time period when the first movement does not include the second movement.

10 Claims, 15 Drawing Sheets

(56) References Cited

U.S. PATENT DOCUMENTS

2018/0075656 A1* 3/2018 Kim ..................... G06T 19/006

FOREIGN PATENT DOCUMENTS

| JP | 2014-167673 A | 9/2014 |
| JP | 2015-106327 A | 6/2015 |
| JP | 2015-127937 A | 7/2015 |
| JP | 2017-016647 A | 1/2017 |

OTHER PUBLICATIONS

Japanese Office Action dated Aug. 3, 2021 for corresponding Japanese Patent Application No. 2017-185383, with English Translation, 7 pages.

* cited by examiner

FIG. 2

| NUMBER | TIME | FRAME IMAGE | GAZE COORDINATES |
|---|---|---|---|
| 1 | t1 | IM1 | (x1,y1) |
| 2 | t2 | IM2 | (x2,y2) |
| 3 | t3 | IM3 | (x3,y3) |
| 4 | t4 | IM4 | (x4,y4) |
| ... | ... | ... | ... |
| N-1 | t(n-1) | IM(n-1) | (x(n-1),y(n-1)) |
| N | tn | IMn | (xn,yn) |
| N+1 | t(n+1) | IM(n+1) | (x(n+1),y(n+1)) |
| ... | ... | ... | ... |

NON-TRANSITORY COMPUTER-READABLE STORAGE MEDIUM, DISPLAY CONTROL METHOD, AND DISPLAY CONTROL APPARATUS

CROSS-REFERENCE TO RELATED APPLICATION

This application is based upon and claims the benefit of priority of the prior Japanese Patent Application No. 2017-185383, filed on Sep. 26, 2017, the entire contents of which are incorporated herein by reference.

FIELD

The embodiments discussed herein are related to a non-transitory computer-readable storage medium, a display control method, and a display control apparatus.

BACKGROUND

A driving support apparatus that determines the reliability of a result of estimating an attentive watching state with respect to a target area to be attentively watched by the driver of a vehicle is known. The driving support apparatus determines the type of gaze data indicating a gaze direction of the driver. Based on a target area to be attentively watched that is set depending on a driving situation and a gaze direction indicated by plural pieces of gaze data acquired during a determination period predetermined depending on the driving situation, the driving support apparatus estimates the attentive watching state of the driver on the target area to be attentively watched. The driving support apparatus then calculates the reliability level of a result of estimating the attentive watching state, based on at least one of the setting accuracy of the target area to be attentively watched and the configuration state of gaze data regarding the type of each of the plural pieces of gaze data acquired during the determination period.

A saliency analysis apparatus capable of generating information indicating a correlation between top-down attention and bottom-up attention is also known. The saliency analysis apparatus is characterized in that fixed range points of the gaze are calculated as a consumer concern area from gaze tracking information and, in order for the correlation between the fixed range points and the saliency to be visually recognized, an image in which the fixed range points are plotted on a map is generated as saliency evaluation information.

A management server capable of verifying the possibility of information leakage is also known. The management server acquires a screen image of a user terminal, acquires, for each display area in the screen image, secret-level information that identifies an area with a high level of secrecy, and acquires gaze information attentively watched by the user in the screen image. Based on the acquired secret-level information and gaze information, the management server then causes an administrator terminal to display information that visualizes whether the user has attentively watched an area with a high level of secrecy of the screen image.

An attentive-watch-area-data generation apparatus for learning which areas among a plurality of displayed areas have been attentively watched and in what order the areas have been attentively watched is also known. Upon detecting that the movement of the eye point has stopped, the attentive-watch-area-data generation apparatus generates fixed range point data including fixed range point coordinates representing the position of the eye point. The attentive-watch-area-data generation apparatus then searches area data including in-screen area coordinates including fixed range point coordinates in the fixed range point data and reads an area identifier (ID) from the area data. Then, the attentive-watch-area-data generation apparatus generates attentive watch area data including the read area ID and associates the attentive watch area data with attentive watch order information in accordance with the order in which the attentive watch area data is generated.

Related techniques are disclosed, for example, in Japanese Laid-open Patent Publication No. 2015-127937, Japanese Laid-open Patent Publication No. 2014-167673, Japanese Laid-open Patent Publication No. 2017-016647, and Japanese Laid-open Patent Publication No. 2013-080365.

SUMMARY

According to an aspect of the invention, a non-transitory computer-readable storage medium storing a program that causes a computer to execute a process, the process including obtaining gaze data that indicates a position of a gaze of a user at each of a plurality of times, determining a first movement regarding the gaze of the user based on the gaze data, displaying, on a screen of a display device, gaze information indicating a position of the gaze at each of a plurality of times from a time at which a second movement occurs when the first movement includes the second movement, and displaying, on the screen, gaze information indicating a position of the gaze at each of a plurality of times during a specified time period when the first movement does not include the second movement.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of a table that is stored in a data storage unit;

DESCRIPTION OF EMBODIMENTS

The eye-gaze of a person is analyzed in such ways as described in the background. However, for example, when heatmaps and scan paths are generated and displayed sequentially in order of time from gaze data of a person at each time of a plurality of times, the display image including heatmaps and scan paths is difficult to interpret in some cases.

In an aspect, the disclosed techniques improve the visibility of gaze data indicating a specific movement.

Hereinafter, examples of embodiments of the disclosed techniques will be described in detail with reference to the accompanying drawings.

First Embodiment

Figure 1:
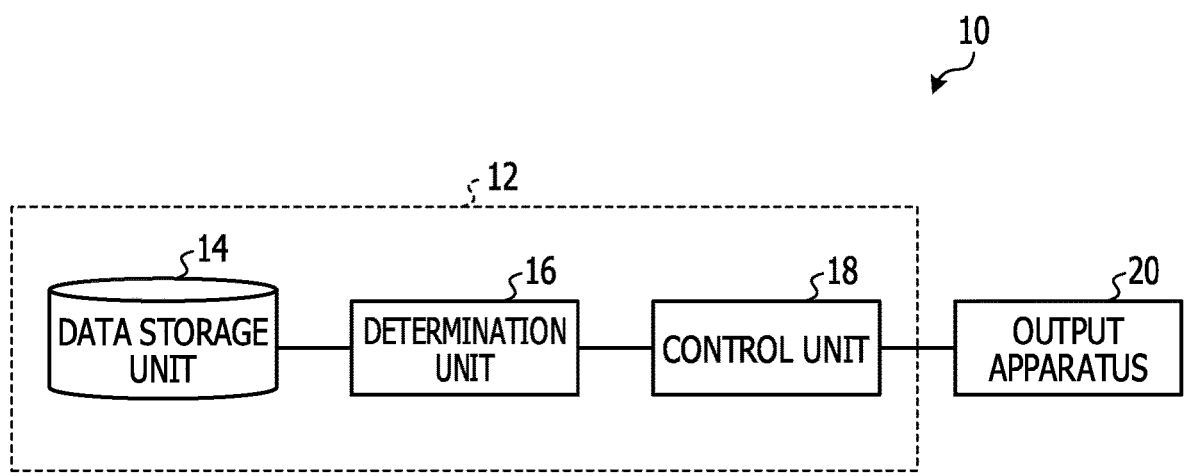
FIG. 1 is a schematic block diagram of a display apparatus according to an embodiment.

As illustrated in FIG. 1, a display apparatus 10 according to a first embodiment includes a display control apparatus 12 and an output apparatus 20.

The display control apparatus 12 causes a display image, which represents gaze data including a time sequence of positions of the gaze of a user, to be displayed on the output apparatus 20. The display control apparatus 12 includes a data storage unit 14, a determination unit 16, and a control unit 18.

In the data storage unit 14, gaze data including a time sequence of positions of the gaze of a user is stored. The gaze data is, for example, stored in a table format as illustrated in FIG. 2. In the table illustrated in FIG. 2, a number indicating identification information, a time, a frame age corresponding to the time, and gaze coordinates representing gaze data are stored in association with each other. In the table illustrated in FIG. 2, for example, as data corresponding to number 1, the gaze coordinates (x1, y1) are stored in a frame image IM1 acquired at a time t1. The frame image IM1 is an image seen by the user at the time t1.

Figure 3:
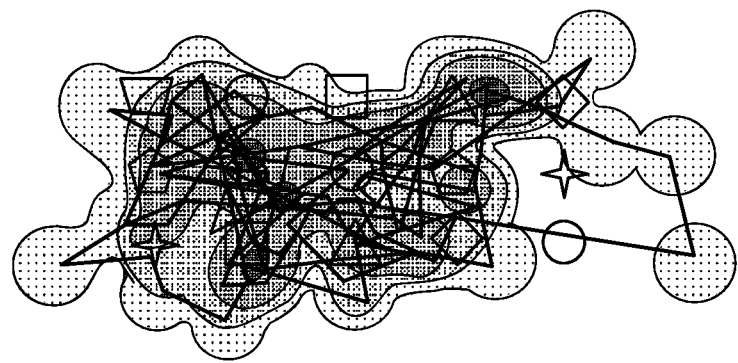
FIG. 3 is a diagram illustrating an example of a display image including heatmaps and scan paths.

In FIG. 3, FIG. 4A, FIG. 4B, FIG. 4C, FIG. 5A, FIG. 5B, and FIG. 5C, illustrative diagrams depicting display images generated from gaze data are illustrated. As illustrated in FIG. 3, a display image in the present embodiment includes heatmaps of the gaze and scan paths of the gaze. Note that, in FIG. 3, areas in shades of gray represent heatmaps of the gaze, and the lines represent the scan paths of the gaze.

As illustrated in FIG. 3, in displaying heatmaps and scan paths, when heatmaps and scan paths obtained from gaze data at times are simultaneously displayed on a display image, movements regarding the gaze of the user are difficult to determine.

Specifically, when heatmaps representing fixed range gazes at the respective times are simultaneously displayed, there is no indication of time and therefore the sequential time order of gaze positions of the user becomes unknown. In addition, when scan paths representing gaze movement at the respective times are simultaneously displayed, the portion of an object that the user has steadily gazed at becomes unknown, and the greater the increase in the number of pieces of data to be displayed, the greater the complexity of lines representing scan paths and the more difficult the determination of the lines.

Figure 4A:
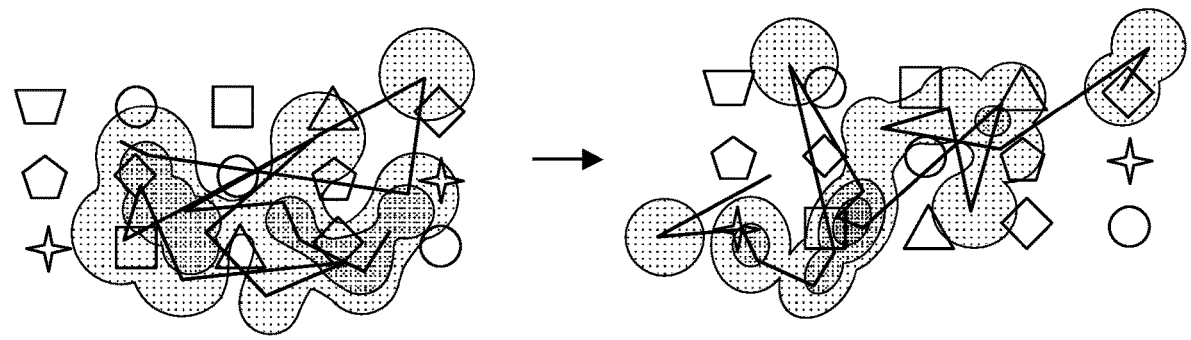
FIG. 4A is an illustrative diagram depicting display images including heatmaps and scan paths.
Figure 4B:
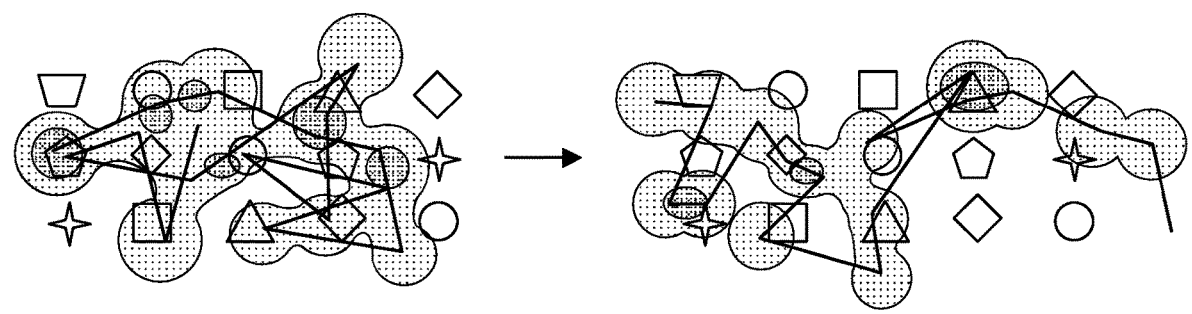
FIG. 4B is an illustrative diagram depicting display images including heatmaps and scan paths.
Figure 4C:
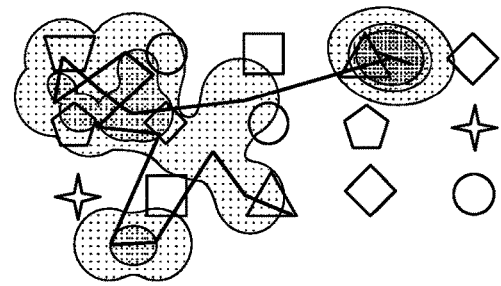
FIG. 4C is an illustrative diagram depicting display images including heatmaps and scan paths.

Therefore, for example, as illustrated in FIG. 4A, FIG. 4B, and FIG. 4C, the case where display images generated from gaze data at the respective times during a given time interval are displayed sequentially in order of time is conceivable. Specifically, after a display image on the left side of FIG. 4A is displayed, a display image on the right side of FIG. 4A is displayed. Subsequently, after a display image on the left side of FIG. 4B is displayed, a display image on the right side of FIG. 4B is displayed. Then, after a display image on the left side of FIG. 4C is displayed, a display image on the right side of FIG. 4C is displayed. In this case, the number of pieces of data to be displayed is fixed.

However, in some of the cases where the number of pieces of data to be displayed is fixed, specific movements of the user are difficult to determine. For example, as illustrated in FIG. 5A, FIG. 5B, and FIG. 5C, when the specific movement of the user is a back-and-forth movement, fixing the number of pieces of data to be displayed enables gaze data to be separated by a given number of pieces of data, such that the manner of the back-and-forth movement of the gaze of the user is difficult to determine.

Figure 5A:
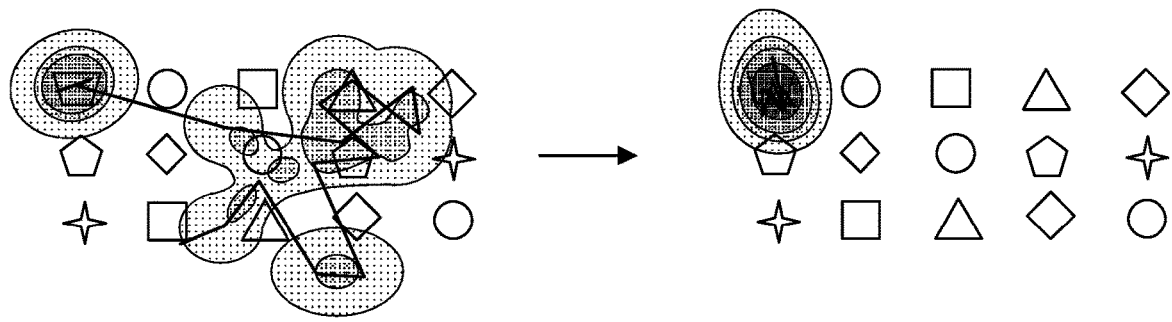
FIG. 5A is an illustrative diagram depicting display images including heatmaps and scan paths.
Figure 5B:
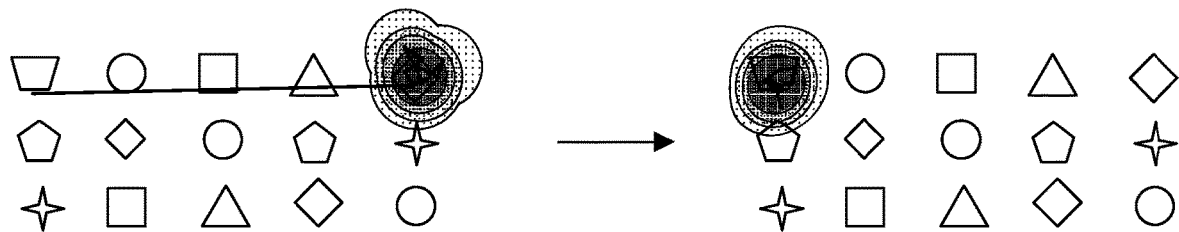
FIG. 5B is an illustrative diagram depicting display images including heatmaps and scan paths.
Figure 5C:
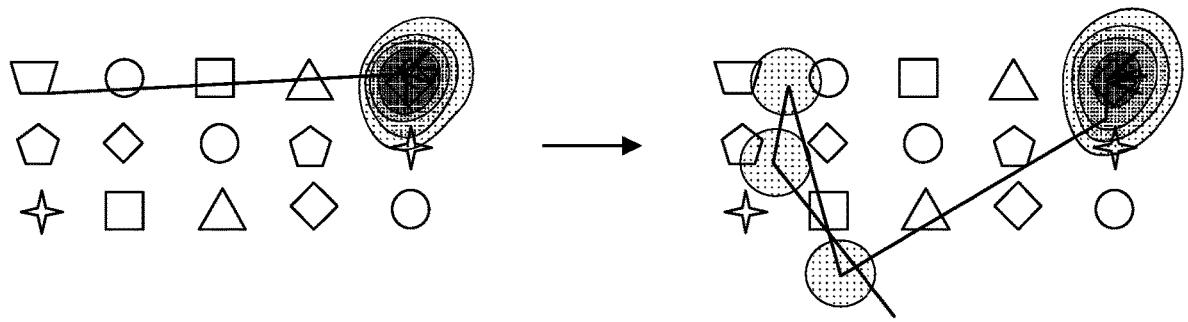
FIG. 5C is an illustrative diagram depicting display images including heatmaps and scan paths.

Specifically, after a display image on the left side of FIG. 5A is displayed, a display image on the right side of FIG. 5A is displayed. Then, when a display image on the left side of FIG. 5B is displayed, a fixed range point seen in the display image on the right side of FIG. 5A disappears. In addition, when a display image on the right side of FIG. 5B is displayed, a fixed range point seen in the display image on the left side of FIG. 5B disappears. Likewise, when a display image on the left side of FIG. 5C is displayed, the fixed range point seen the display image on the left side of FIG. 5B disappears.

Accordingly, in the present embodiment, it is determined whether the movement regarding the gaze of a user is a specific movement, and, accordance with a determination result for the specific movement, control is performed to dynamically change the display interval of gaze data to generate display images and to display each of the display images sequentially in order of time. In the present embodiment, the case where the specific movements are a fixed range movement of the gaze and a back-and-forth movement of the gaze will be described by way of example. Hereinafter, description will be given in detail.

The determination unit 16 determines a movement regarding the gaze of a user from gaze data stored in the data storage unit 14. The determination unit 16 determines whether the movement regarding the gaze of a user is a fixed range movement or a back-and-forth movement.

Specifically, based on the gaze data stored in the data storage unit 14, when the travel distance of the gaze of the user with respect to a specific position in a given number of pieces of data is less than or equal to a preset threshold for a fixed range movement, the determination unit 16 determines that the movement regarding the gaze of the user is a fixed range movement.

For example, for the respective frame images at times stored in the data storage unit 14, the determination unit 16 calculates a distance between the gaze position in a frame image at a specific time and each of the gaze positions in frame images at times following the specific time. Based on each of the distances between the gaze positions, if gazes at times following the specific time for m or more successive frames are within a radius R centered around the gaze position in the frame image at the specific time, the determination unit 16 determines that the movement regarding the gaze is a fixed range movement.

Figure 6:
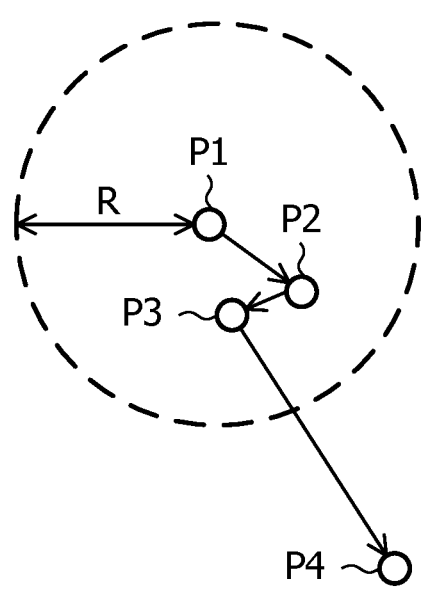
FIG. 6 is an illustrative diagram depicting a fixed range movement of the gaze.

For example, as illustrated in FIG. 6, if m is greater than or equal to three, such as the case where a gaze position P2 at a time t2 and a gaze position P3 at a time t3 are within the radius R centered around a gaze position P1 at a time t1, the determination unit 16 determines that the movement regarding the gaze of the user is a fixed range movement. In contrast, if the gaze has moved outside the radius R centered around the gaze position P1 at the time t1 and has reached a gaze position P4 at a time t4, the determination unit 16 determines that the gaze has moved.

In addition, based on gaze data stored in the data storage unit 14, the determination unit 16 detects fixed range points corresponding to the fixed range movement of the, gaze of the user in a plurality of frame images. For example, in the example illustrated in FIG. 6, the gaze position P1 corresponding to the beginning point of the fixed range movement of the, gaze of the user is detected as a fixed range point. Based on a detection result of fixed range points, if the distance between the position of an nth fixed range point and the position of an (n+2)th fixed range point is less than or equal to a preset threshold for a back-and-forth movement, the determination unit 16 determines that the movement regarding the gaze of the user is a back-and-forth movement of the gaze.

Figure 7:
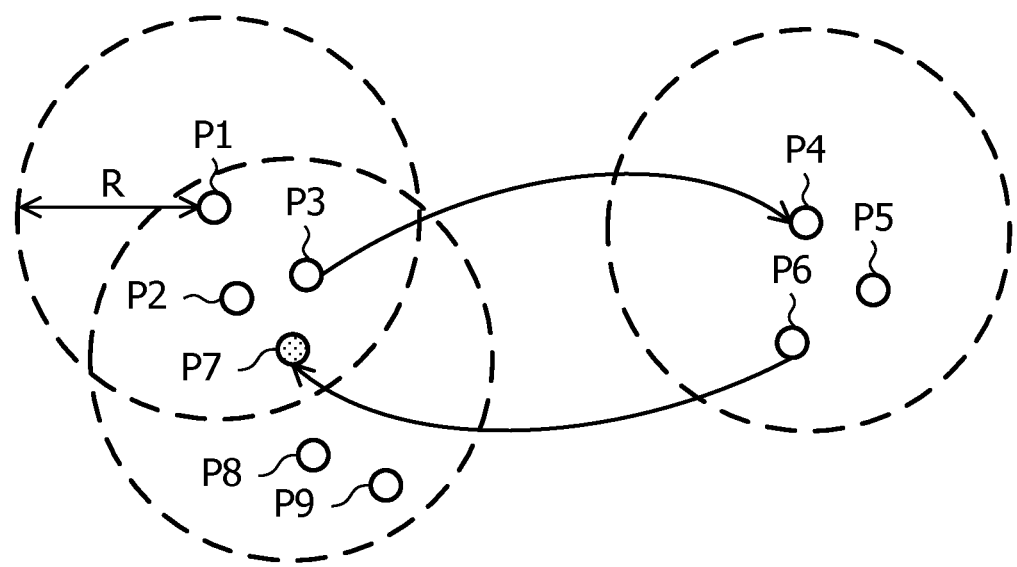
FIG. 7 is an illustrative diagram depicting a back-and-forth movement of the gaze.

In FIG. 7, an illustrative diagram depicting a back-and-forth movement of the gaze is illustrated. In the example illustrated in FIG. 7, a first fixed range movement is detected with the gaze positions P1, P2, and P3, a second fixed range movement is detected with gaze positions P4, P5, and P6, and a third fixed range movement is detected with gaze positions P7, P8, and P9. In this case, the gaze position P1 is detected as a fixed range point corresponding to the first fixed range movement, the gaze position P4 is detected as a fixed range point corresponding to the second fixed range movement, and the gaze position P7 is detected as a fixed range point corresponding to the third fixed range movement. At this moment, if the distance between the first fixed range point P1 and the third fixed range point P7 is less than or equal to a threshold R for a back-and-forth movement, the determination unit 16 determines that the movement regarding the gaze of the user is a back-and-front movement of the gaze.

If it is determined by the determination unit 16 that the movement regarding the gaze is a specific movement, the control unit 18 generates, for each time of a plurality of times from a time at which the specific movement began to the current time, a display image from gaze data from the time at which the specific movement began to the time being considered. The control unit 18 then performs control so as to display the generated image for each time.

In addition, if it is determined by the determination unit 16 that the movement regarding the gaze is a normal movement different from a specific movement, the control unit 18 generates, for each time of the plurality of times, a display image from gaze data from a time preceding the time being considered by a given time interval to the time being considered. The control unit 18 then performs control so as to display the generated image for each time.

Figure 8A:
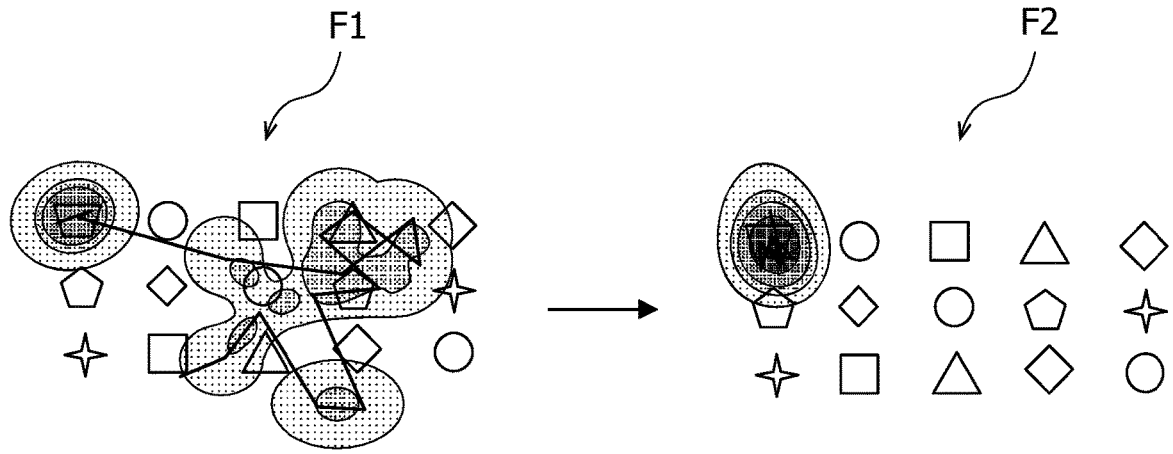
FIG. 8A is an illustrative diagram depicting display control of a display image in the present embodiment.
Figure 8B:
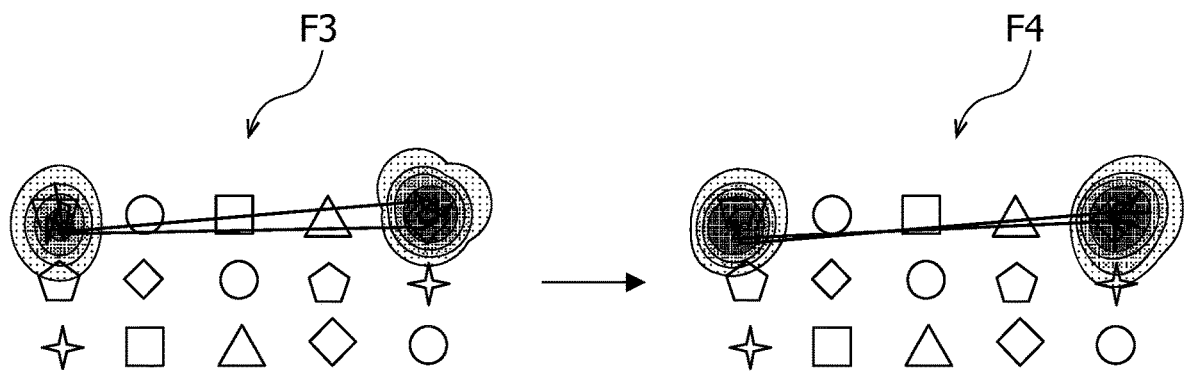
FIG. 8B is an illustrative diagram depicting display control of a display image in the present embodiment.
Figure 8C:
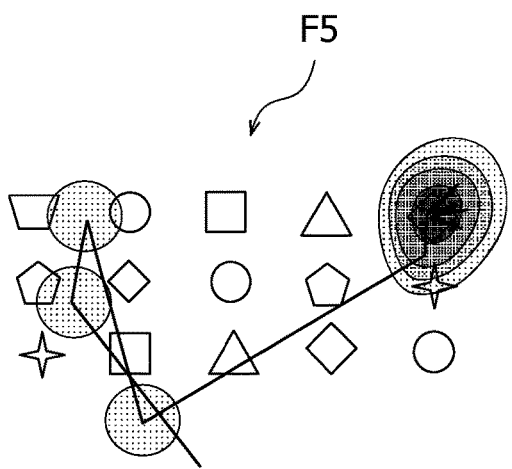
FIG. 8C is an illustrative diagram depicting display control of a display image in the present embodiment.

In FIG. 8A, FIG. 8B, and FIG. 8C, illustrative diagrams depicting display control for display images are illustrated. As illustrated in FIG. 8A, in a scene F1, the movement regarding the gaze of the user is determined to be a normal movement. Therefore, in the scene F1, the control unit 18 displays a display image generated from gaze data at each time of a plurality of times during the given time interval.

Next, if a fixed range movement, which is a specific movement, is determined in a scene F2 in FIG. 8A, the control unit 18 performs control so as to display a display image generated from gaze data at each time of a plurality times from a time at which the fixed range movement, began to the current time.

If a back-and-forth movement, which is a specific movement, is determined in a scene F3 in FIG. 8B, the control unit 18 performs control so as to display a display image generated from gaze, data at each time, of a plurality of times from a time at which the back-and-forth movement began to the current time. Thus, the back-and-forth movement of the gaze is continued in a scene F4 in FIG. 8B, and therefore a display image generated from gaze data at each time of the plurality of times is displayed. In a scene F5 in FIG. 8C, the back-and-forth movement of the gaze is complete, and the number of pieces of gaze data used for display images returns to a given number.

On the output apparatus 20, a display image in accordance with control performed by the control unit 18 is displayed. The output apparatus 20 is, for example, implemented by a display and the like.

Figure 9:
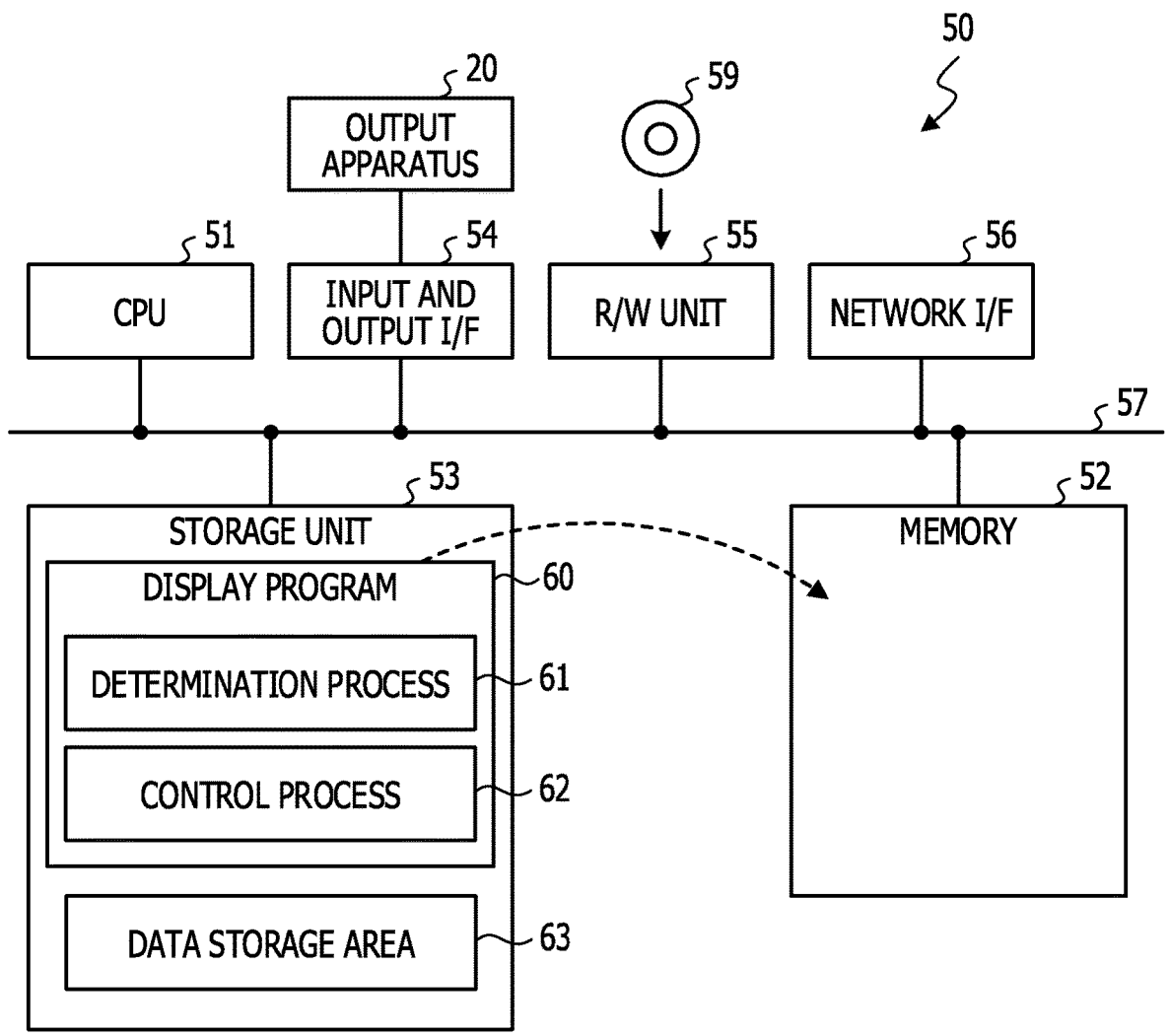
FIG. 9 is a block diagram illustrating a schematic configuration of a computer that functions as a display apparatus according to an embodiment.

The display control apparatus 12 is, for example, able to be implemented by a computer 50 illustrated in FIG. 9. The computer 50 includes a central processing unit (CPU) 51, a memory 52 as a temporary storage area, and a nonvolatile storage unit 53. The computer 50 also includes an input and output interface (I/F) 54 to which an input and output apparatus such as the output apparatus 20 is coupled, and a read/write (R/W) unit 55 that controls reading and writing data from and to a recording medium 59. The computer 50 also includes a network I/F 56 that is coupled to a network, such as the Internet. The CPU 51, the memory 52, the storage unit 53, the input and output I/F 54, the R/W unit 55, and the network I/F 56 are coupled to each other via a bus 57.

The storage unit 53 may be implemented by a hard disk drive (HDD), a solid state drive (SSD), a flash memory, or the like. In the storage unit 53 as a recording medium, a display program 60 for causing the computer 50 to function as the display apparatus 10 is stored. The display program 60 includes a determination process 61 and a control process 62. In a data storage area 63, information constituting the data storage unit 14 is stored.

The CPU 51 reads the display program 60 from the storage unit 53 to load the display program 60 in the memory 52, and sequentially executes processes included in the display program 60. The CPU 51 operates as the determination unit 16 illustrated in FIG. 1 by executing the determination process 61. In addition, the CPU 51 operates as the control unit 18 illustrated in FIG. 1 by executing the control process 61 In addition, the CPU 51 reads information from the data storage area 63 to load the data storage unit 14 in the, memory 52. Thereby, the computer 50 executing the display program 60 functions as the display apparatus 10. The CPU 51 that executes the display program 60, which is software, is hardware.

Note that the functions implemented by the display program 60 may also be implemented by, for example, a semiconductor integrated circuit and, more specifically, by an application specific integrated circuit (ASIC) and the like.

Figure 10:
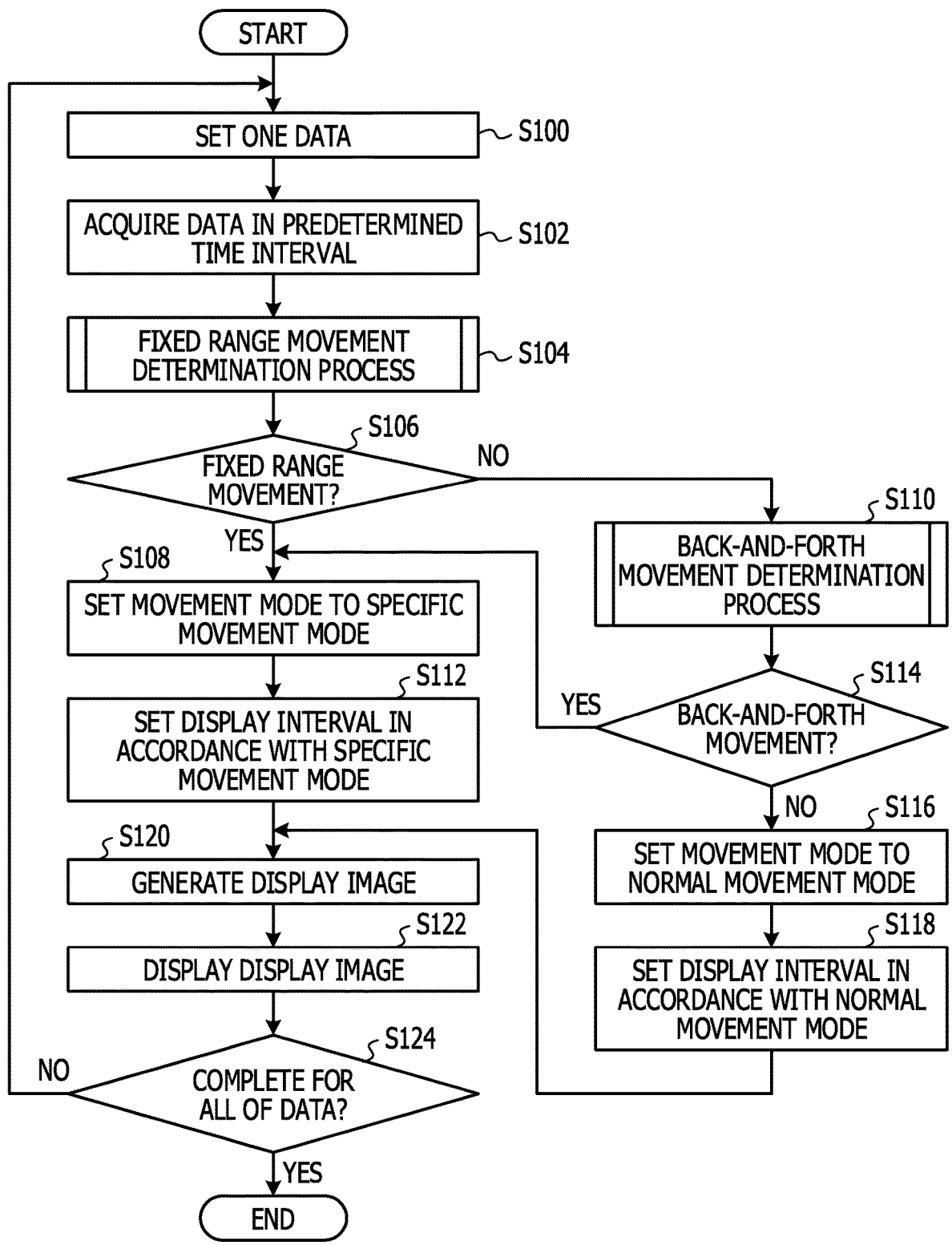
FIG. 10 is a flowchart illustrating an example, of a display process routine in a first embodiment.

Next, the operations of the display apparatus 10 according to the first embodiment will be described. Upon accepting an instruction signal for display of a display image, the display apparatus 10 executes a display process routine illustrated in FIG. 10. In the display process routine, a display image is generated by using frame images at times and gaze data at times, and the output apparatus 20 is controlled so that the generated display images are sequentially displayed. Note that hereinafter the frame images at times and the gaze data at times stored in the data storage unit 14 are simply referred to as data.

In step S100, the determination unit 16 sets one piece of data out of the respective pieces of data at times stored in the data storage unit 14.

In step S102, the determination unit 16 acquires, from the data storage unit 14, data at times preceding the time of data set in step S100, the data being data at times in a predetermined time interval from the time of the data set in the step S100. Note that, the predetermined time interval is, for example, set longer than a given time interval that is set when a display image corresponding to a normal operation is generated.

In step S104, based on the data set in step S100 and the data in the predetermined time interval acquired in step S102, it is determined whether a fixed range movement of the gaze is performed. Step S104 is implemented by a fixed range movement determination process described later.

In step S106, the determination unit 16 determines, based on a determination result in step S104, whether a fixed range movement of the gaze is performed. If a fixed range movement of the gaze is performed, the process proceeds to step S108. If, however, no fixed range movement of the gaze is performed, the process proceeds to step S110.

In step S108, the determination unit 16 sets the gaze movement mode to a specific movement mode.

In step S110, the determination unit 16 determines whether a back-and-forth movement of the gaze is performed. Step S110 is implemented by a back-and-forth movement determination process described later.

In step S112, the determination unit 16 sets, as the display interval, a period of time from a time at which a specific movement begins to a time of the data set in step S100. The time at which a specific movement begins is the beginning time of a fixed range movement stored in the stationary process determination process in step S104 described later or the beginning time of the back-and-forth movement stored in the back-and-forth movement process n step S110 described later.

In step S114, the determination unit 16 determines, based on a determination result in step S110, whether a back and-forth movement of the gaze is detected. If a back-and-forth movement of the gaze is detected, the process proceeds to step S108. If, however, no back-and-forth movement of the gaze is detected, the process proceeds to step S116.

In step S116, the determination unit 16 sets the gaze movement mode to a normal movement mode.

In step S118, the determination unit 16 sets, as the display interval, the given time interval for the normal movement mode.

In step S120, the control unit 18 generates a display image in accordance with a movement mode set in step S108 or step S116. Specifically, if the movement mode is a specific movement mode, the control unit 18 generates a display image from data of the display interval set in step S112. If the movement mode is the normal movement mode, the control unit 18 generates a display image from data of the display interval set in step S118.

In step S122, the control unit 18 performs control so as to display the display image generated in step S120.

In step S124, the control unit 18 determines, for all of the data stored in the data stored unit 14, whether the process from step S100 to step S122 is performed. If, for all of the data, the process from step S100 to step S122 is performed, the display process terminates. If data for which the process from step S100 to step S122 is not performed is in the data storage unit 14, the process returns to step S100.

Figure 11:
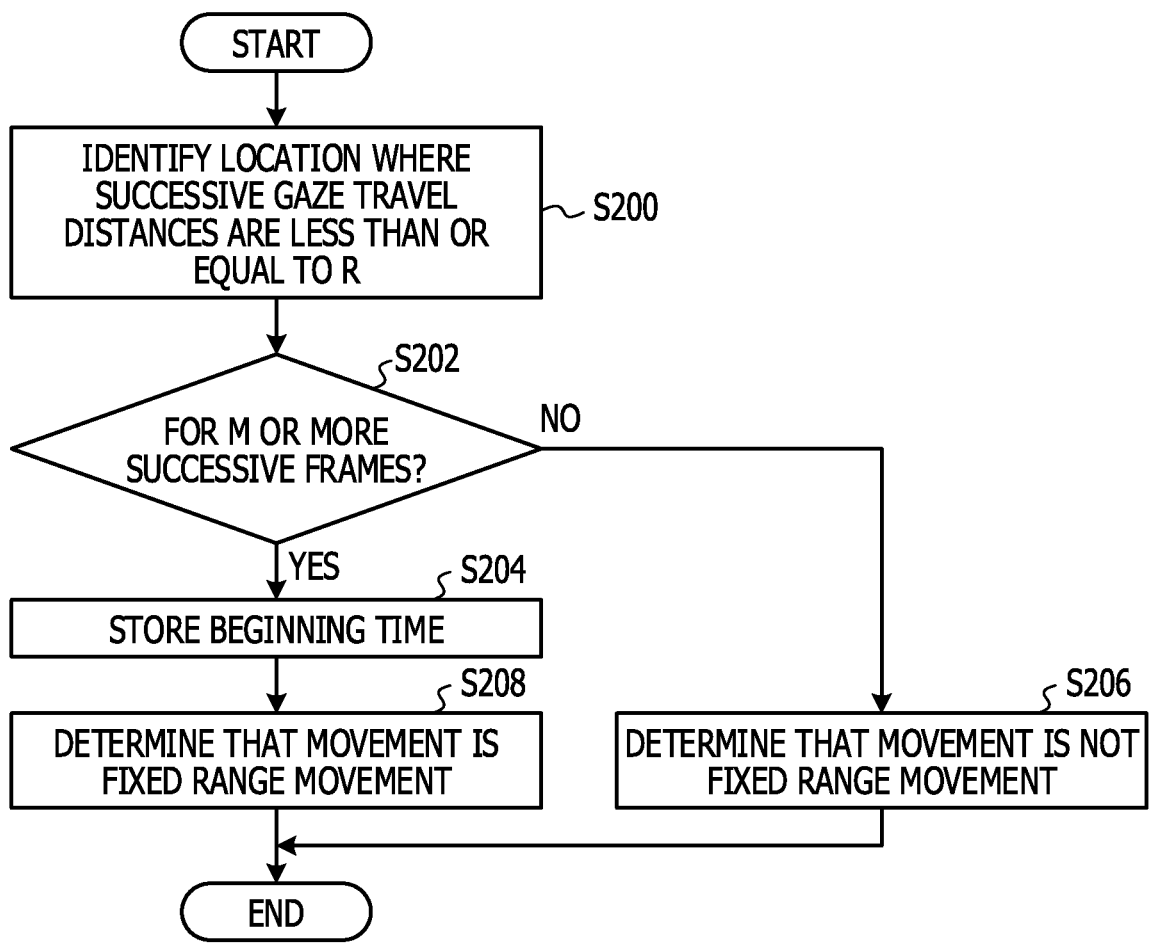
FIG. 11 is a flowchart illustrating an example of a fixed-range-movement determination process routine in a first embodiment.

In step S104 of the display process routine, the fixed-range-movement determination process routine illustrated in FIG. 11 is executed.

In step S200, the determination unit 16 calculates the gaze travel distance based on the data in the predetermined time interval acquired in step S102. Specifically, the distance between the gaze position at the last time in a given time interval and each of gaze positions before the last time is calculated. Then, a location where frame, images having a gaze travel distance less than or equal to R are provided for m or more successive frames is identified, and the beginning point of the successive frame images is identified as the beginning point of a fixed range movement.

In step S202, the determination unit 16 determines, based on a result obtained in step S200, whether a fixed range movement is present or absent. If the gaze travel distance is less than or equal to R for m or more successive frames, the fixed range movement is determined to be present and the process proceeds to step S204. If, however, not all of the gaze travel distances are less than or equal to R for m or more successive frames, the fixed range movement is determined to be absent and the process proceeds to step S206.

In step S204, the determination unit 16 causes the first time in the predetermined time interval to be stored as the beginning time of a fixed range movement, which is a specific movement, in a storage unit (not illustrated).

In step S206, the determination unit 16 determines that the movement regarding the gaze of the user is not a fixed range movement.

In step S208, the determination unit 16 determines that the movement regarding the gaze of the user is a fixed range movement as a specific movement.

Figure 12:
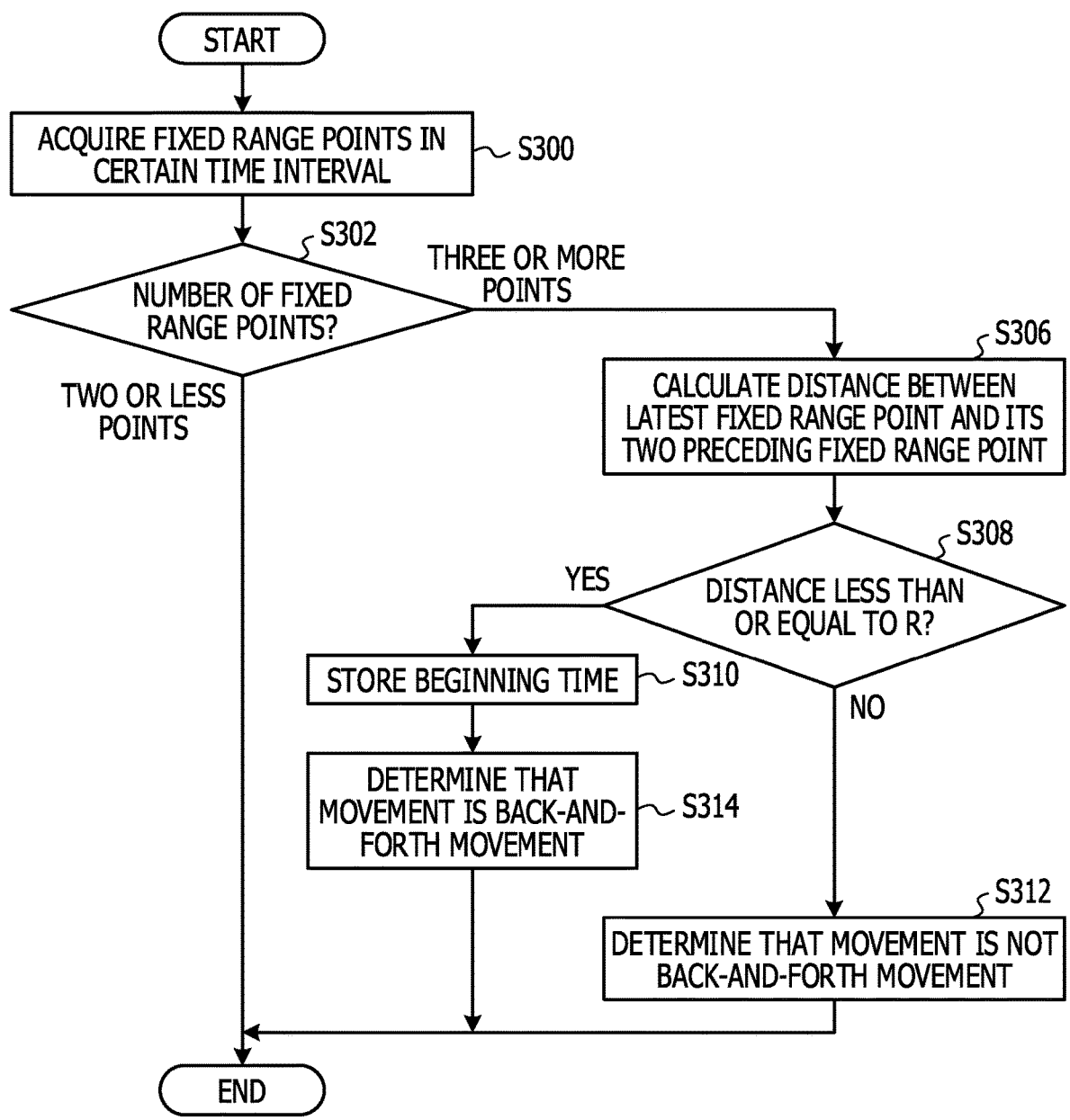
FIG. 12 is a flowchart illustrating an example of a back-and-forth movement determination process routine in a first embodiment.

In step S110 of the display process routine, a back-and-forth movement determination process routine illustrated in FIG. 12 is executed.

In step S300, fixed range points corresponding to a fixed range movement from the beginning time of the previous specific movement to a time corresponding to the data set in the above step S100 are acquired.

In step S302, the determination unit 16 determines, based on an acquisition result of the number of fixed range points obtained in step S300, whether the number of fixed range points is two or less or the number of fixed range points is three or more. If the number of fixed range points is two or less, the process terminates. If the number of fixed range points is three or more, the process proceeds to step S306.

In step S306, based on the fixed range points acquired in step S300, the determination unit 16 calculates a distance between the latest fixed range point and its two preceding fixed range point.

In step S308, the determination unit 16 determines whether the distance calculated in S306 is less than or equal to R. If the distance calculated in step S306 is less than or equal to R, the process proceeds to step S310. If, however, the distance calculated in step S306 is greater than R, the process proceeds to step S312.

In step S310, the determination unit 16 causes the first time in the predetermined time interval to be stored as the beginning time of the back-and-forth movement, which is a specific movement, in the storage unit (not illustrated).

In step S312, the determination unit 16 determines that the movement regarding the gaze of the user is not a back-and-forth movement.

In step S314, the determination unit 16 determines that the movement regarding the gaze of the user is a back-and-forth movement as specific movement.

As described above, in displaying a display image representing gaze data that indicates the position of the gaze of the user at each time of a plurality of times, the display apparatus according to the present embodiment determines the movement regarding the gaze of the user from gaze data. In the case where the movement regarding the gaze is a specific movement, the display apparatus performs control so as to display a display image generated from gaze data at each time of a plurality of times from a time at which the specific movement began to the current time. In contrast, in the case of a normal movement, the display apparatus performs control so as to display a display image generated from gaze data at each time of a plurality of times during a given time interval. Thereby, the visibility of gaze data indicating a specific movement may be improved. Therefore, gaze data may be visualized more clearly.

Second Embodiment

Next, a second embodiment will be described. The second embodiment differs from the first embodiment in that the movement of the gaze of a user who is reading text presented on an object is determined to be a specific movement. Note that the configuration in the second embodiment, which is similar to that in the first embodiment, is denoted by the same reference numerals as in the first embodiment and redundant description thereof is omitted.

In determining a movement regarding the gaze of a user, based on gaze data stored in the data storage unit 14, the determination unit 16 in the second embodiment detects fixed range points corresponding to a fixed range movement of the gaze of the user. Based, on the travel directions and the travel distances of the gaze with respect to a fixed range point obtained from a detection result of fixed range points in a plurality of frame images stored in the data storage unit 14, the determination unit 16 determines whether the movement regarding the gaze of the user is the movement of the gaze of the user who is reading text.

Figure 13:
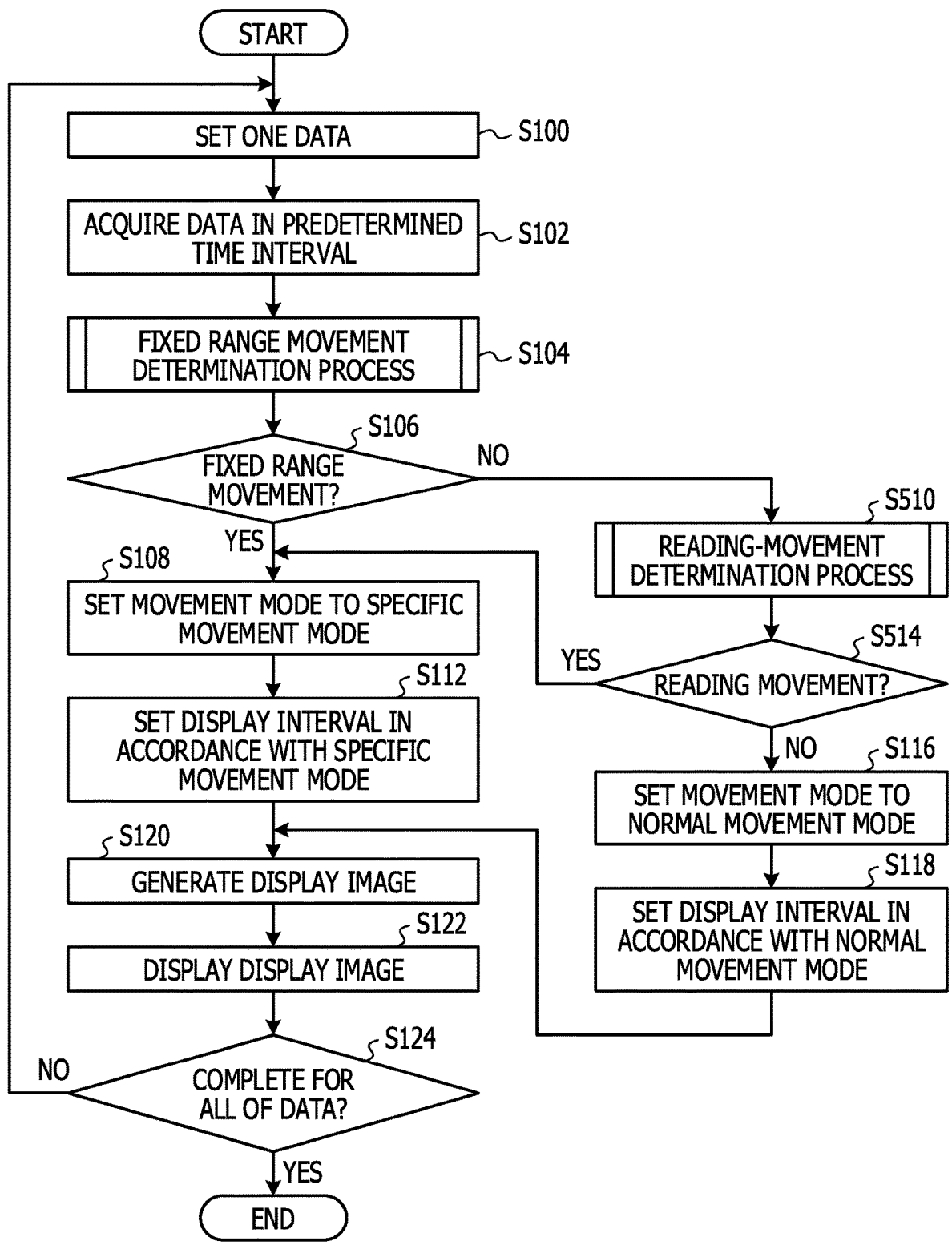
FIG. 13 is a flowchart illustrating an example of a display process routine in a second embodiment.

The operations of the display apparatus 10 according to the second embodiment will be described. Upon accepting an instruction signal for display of a display image, the display apparatus 10 according to the second embodiment executes a display process routine illustrated in FIG. 13. In the display process routine, display images are generated by using frame images at times and gaze data at times, and the output apparatus 20 is controlled to display the generated display images.

Step S100 to step S108 and step S112 to step S124 are executed as is the case in the first embodiment.

Figure 14:
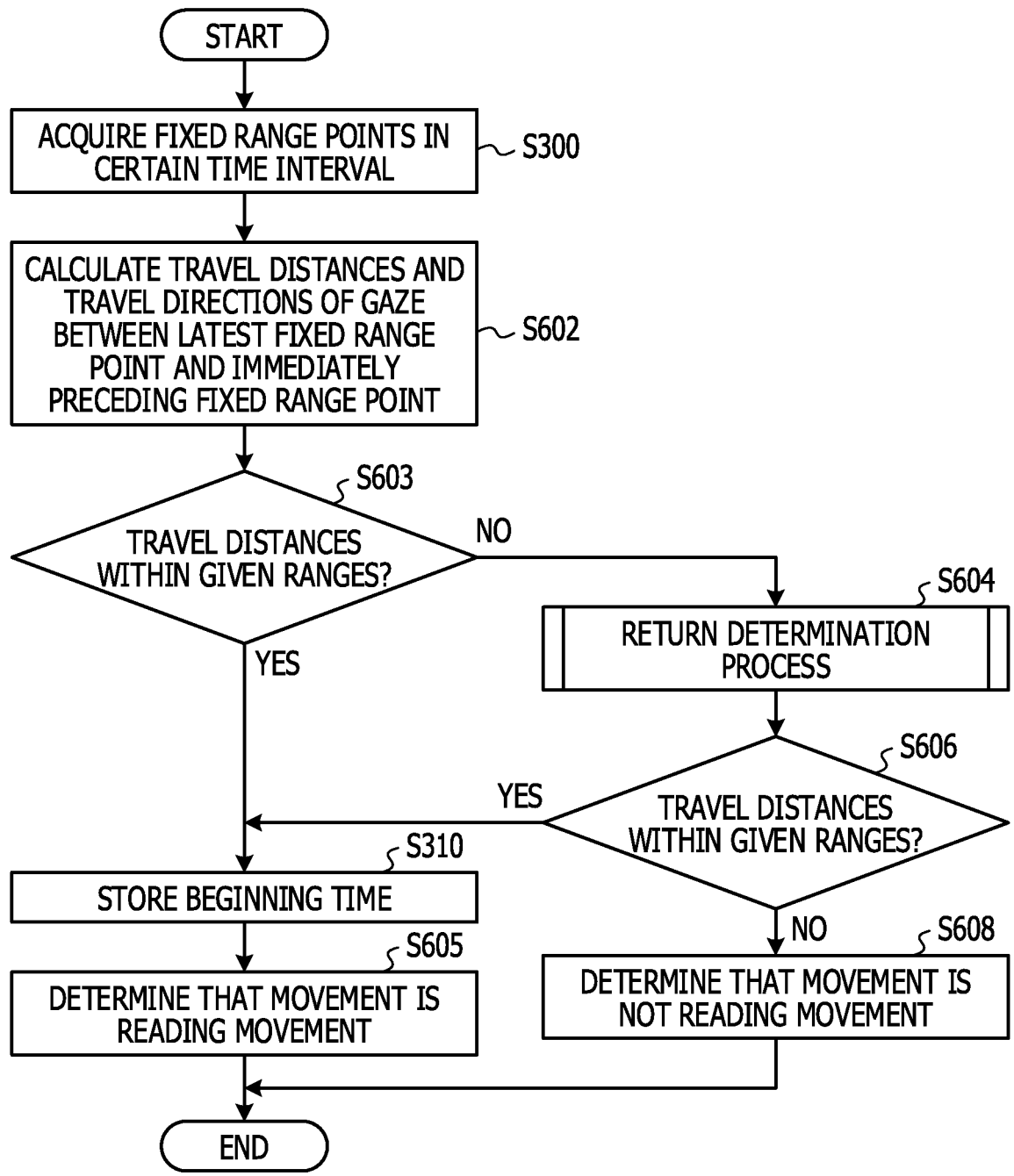
FIG. 14 is a flowchart illustrating an example of a reading-movement determination process routine in a second embodiment.

In step S510, the determination unit 16 determines whether the movement regarding the gaze of the user is a movement of the gaze of the user who is reading text Step S510 is implemented by a reading-movement determination process routine illustrated in FIG. 14.

In step S514, the determination unit 16 determines, based on a determination result in step S510, whether a reading movement is performed. If a reading movement is performed, the process proceeds to step S108. If, however, no reading movement is performed, the process proceeds to step S114.

Step S300 and step S310 of the reading-movement determination process routine illustrated in FIG. 14 are executed as is the case in the back-and-forth movement determination process routine in the first embodiment.

In step S602, based on an acquisition result of the number of fixed range points obtained in step S300, the determination unit 16 calculates the travel distances and the travel directions of the gaze between the latest fixed range point and the fixed range point immediately preceding the latest fixed range point. Specifically, the determination unit 16 calculates the gaze travel distance in the X-direction between fixed range points and the gaze travel distance in the Y-direction between fixed range points.

In step S603, the determination unit 16 determines whether a condition indicating that the gaze travel distance in the X-direction between fixed range points, which is obtained in step S602, is within a given range and the gaze travel distance in the Y-direction is within a given range is satisfied. If the condition is satisfied, the process proceeds to step S310. If, however, the condition is not satisfied, the process proceeds to step S604. For example, the determination unit 16 determines whether a condition indicating that the gaze travel distance in the X-direction is within a range from a threshold R for determining a fixed range point to 2R and the gaze travel distance in the Y-direction is within a preset value close to zero is satisfied.

In step S604, the determination unit 16 determines whether a return is inserted into text. Step S604 is implemented by a return determination process routine illustrated in FIG. 15 described later.

In step S605, the determination unit 16 determines that the movement regarding the gaze of the user is a reading movement.

In step S606, based on a determination result in the above step S604, if a return is inserted into the text, the determination unit 16 proceeds, to step S310. If, however, there is no return in the text, the determination unit 16 proceeds to step S608.

In step S608, the determination unit 16 determines that the movement regarding the gaze of the user is not a reading movement.

Figure 15:
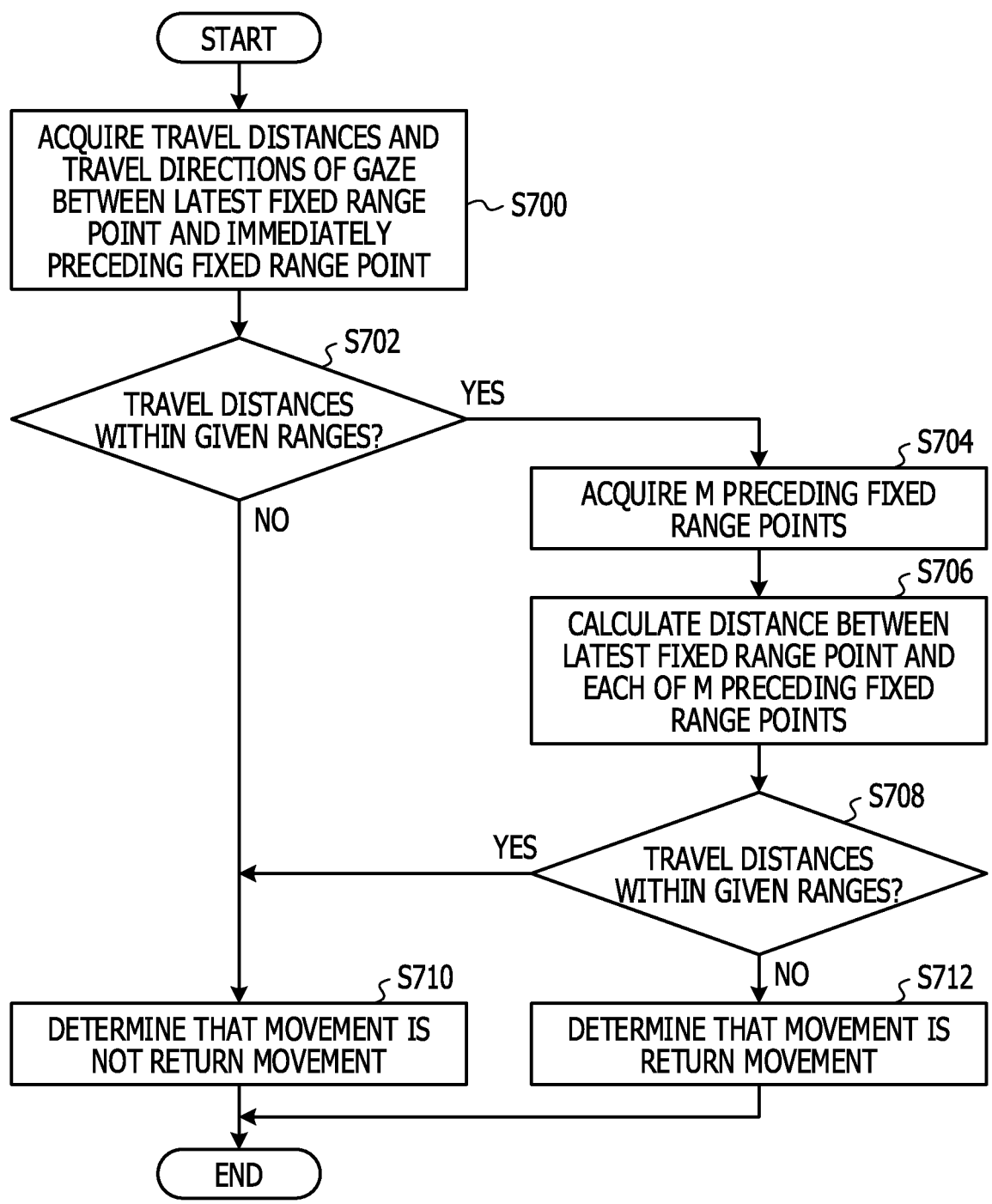
FIG. 15 is a flowchart illustrating an example of a return determination process routine in a second embodiment.

In step S700 of the return determination process routine illustrated in FIG. 15, the determination unit 16 acquires the gaze travel distance in the X-direction between fixed range points and the gaze travel distance in the Y-direction between fixed range points obtained in the above step S602.

In step S702, the determination unit 16 determines whether a condition indicating that the gaze travel distance in the X-direction between fixed range, points, which is acquired in step S700, is within a given range and the, gaze travel distance in the Y-direction is within a given range is satisfied. If the condition is satisfied, the process proceeds to step S704. If, however, the condition is not satisfied, the process proceeds to step S710. For example, the condition may be such that, in the case where text is written horizontally, the gaze travel distance in the X-direction is smaller than the width of one line and the gaze travel distance in the Y-direction is smaller than the space between lines of the text.

In step S704, based on a calculation result of step S300 of the reading-movement determination process routine, the determination unit 16 acquires the positions of m fixed range points preceding the latest fixed range point.

In step S706, based on each of the positions of m preceding fixed range points acquired in step S704, the determination unit 16 calculates the distance between the corresponding fixed range point and the immediately following fixed range point among the fixed range points including the latest fixed range point.

In step S708, for each fixed range point of the m fixed range points whose positions are acquired in the above step S704, the determination unit 16 determines whether a condition indicating that the gaze travel distance in the X-direction from the fixed range point to the immediately following fixed range point is within a given range and the gaze travel distance in the Y-direction is within a given range is satisfied. If the condition is satisfied, the process proceeds to, step S710. If, however, the condition is not satisfied, the process proceeds to step S712. For example, the condition may be such that, in the case where text is written horizontally, the gaze travel distance in the X-direction is within a preset value dose to zero and the gaze travel distance in the Y-direction is smaller than the space between lines of the text.

In step S710, the determination unit 16 determines that the movement regarding the gaze of the user is not a return movement.

In step S712, the determination unit 16 determines that the movement regarding the gaze of the user is a return movement.

As described above, in determining a movement regarding the gaze of a user, the display apparatus according to the second embodiment detects fixed range points corresponding to a fixed range movement of the gaze of the user. Based on the travel direction and the travel distance of the gaze of the user with respect to a fixed range point, which are obtained from a detection result of the fixed range points of the gaze of the user in a plurality of frame images, the display apparatus determines whether the movement regarding the gaze of the user is a movement of the gaze of the user who is reading text. Thereby, when the specific movement is a movement of reading text, the visibility of gaze data indicating the movement of reading text may be improved.

Note that, in the foregoing disclosure, the manner in which each of the programs is stored (installed) in advance in a storage unit has been described. However, embodiments are not limited to this. Programs according to the disclosed techniques may be provided in a manner in which the programs are recorded on recording media such as compact disc read-only memory (CD-ROM), digital-versatile disc ROM (DVD-ROM), or universal serial bus (USB) memory.

All documents, patent applications, and technical standards described herein are incorporated herein by reference to the same extent as if each individual document, patent application, or technical standard was specifically and individually indicated to be incorporated by reference.

In the above embodiments, the case where the fixed range movement of the gaze and the back-and-forth movement of the gaze are determined as specific movements has been described by way of example. However, embodiments are not limited to this. For example, either the fixed range movement of the gaze or the back-and-forth movement of the gaze may be determined as a specific movement.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a computer to execute a process, the process comprising:
    obtaining gaze data that indicates a plurality of gaze points, each of the plurality of gaze points being a gaze point corresponding to a position of a gaze of a user at an associated time point within a first time period;
    determining whether a gaze trajectory represented by the plurality of gaze points indicated by the obtained gaze data includes a first movement regarding the gaze of the user; and
    executing either first processing or second processing in accordance with whether the gaze trajectory corresponding to the first time period includes the first movement,
    the executing of the first processing is performed when the gaze trajectory corresponding to the first time period includes the first movement, the first processing including displaying, on a screen of a display device, first gaze information indicating a first gaze trajectory, the first gaze trajectory being a gaze trajectory represented by first gaze points from among the plurality of gaze points, the first gaze points being one or more gaze points each of which is associated with a second time period within the first time period, the second time period being a time period from a time at which the first movement is started and being longer than a predetermined time length, and
    the executing of the second processing is performed when the first movement is not detected in any part of the gaze trajectory corresponding to the first time period, the second processing including displaying, on the screen, second gaze information indicating a second gaze trajectory, the second gaze trajectory being a gaze trajectory represented by second gaze points from among the plurality of gaze points, the second gaze points being one or more gaze points each of which is associated with a third time period within the first time period, the third time period being a time period having a predetermined time length and being less than the second time period.

2. The non-transitory computer-readable storage medium according to claim 1, wherein the first movement includes a plurality of fixed range movements of the gaze of the user.

3. The non-transitory computer-readable storage medium according to claim 2, wherein each of the plurality of fixed range movements is detected when a move distance of the gaze during a predetermined time period within the first time period is less than or equal to a threshold.

4. The non-transitory computer-readable storage medium according to claim 1, wherein the first movement is a back-and-forth movement of the gaze.

5. The non-transitory computer-readable storage medium according to claim 4, wherein the determining is configured to:
  detect, from among the plurality of gaze points indicated by the obtained gaze data, a plurality of fixed range points each of which corresponds to a fixed range movement, the plurality of fixed range points including a first fixed range point, a second fixed range point appearing after the first fixed range point, and a third fixed range point appearing after the second fixed range point; and
  determine that the gaze trajectory includes the back-and-forth range movement, when a difference between the first fixed range point and the third fixed range point is less than or equal to a threshold.

6. The non-transitory computer-readable storage medium according to claim 1, wherein the first movement is a movement of the gaze of the user who is reading text written on an object.

7. The non-transitory computer-readable storage medium according to claim 6, wherein the determining is configured to:
  detect, from among the plurality of gaze points indicated by the obtained gaze data, a plurality of fixed range points each of which corresponds to a fixed range movement; and
  determine, based on a positional transition of the plurality of fixed range points, whether the gaze trajectory includes the first movement of the user who is reading text written on the object.

8. The non-transitory computer-readable storage medium according to claim 1, wherein the displaying of the first gaze information is configured to display the first gaze trajectory as well as a heatmap based on the plurality of gaze points included in the obtained gaze data.

9. A display control method executed by a computer, the display control method comprising:
  obtaining gaze data that indicates a plurality of gaze points, each of the plurality of gaze points being a gaze point corresponding to a position of a gaze of a user at an associated time point within a first time period;
  determining whether a gaze trajectory represented by the plurality of gaze points indicated by the obtained gaze data includes a first movement regarding the gaze of the user; and
  executing either first processing or second processing in accordance with whether the gaze trajectory corresponding to the first time period includes the first movement,
  the executing of the first processing is performed when the gaze trajectory corresponding to the first time period includes the first movement, the first processing including displaying, on a screen of a display device, first gaze information indicating a first gaze trajectory, the first gaze trajectory being a gaze trajectory represented by first gaze points from among the plurality of gaze points, the first gaze points being one or more gaze points each of which is associated with a second time period within the first time period, the second time period being a time period from a time at which the first movement is started and being longer than a predetermined time length, and
  the executing of the second processing is performed when the first movement is not detected in any part of the gaze trajectory corresponding to the first time period, the second processing including displaying, on the screen, second gaze information indicating a second gaze trajectory, the second gaze trajectory being a gaze trajectory represented by second gaze points from among the plurality of gaze points, the second gaze points being one or more gaze points each of which is associated with a third time period within the first time period, the third time period being a time period having a predetermined time length and being less than the second time period.

10. A display control apparatus comprising:
a memory; and
a processor coupled to the memory and the processor configured to execute a process, the process including:
  obtaining gaze data that indicates a plurality of gaze points, each of the plurality of gaze points being a gaze point corresponding to a position of a gaze of a user at an associated time point within a first time period;
  determining whether a gaze trajectory represented by the plurality of gaze points indicated by the obtained gaze data includes a first movement regarding the gaze of the user; and
  executing either first processing or second processing in accordance with whether the gaze trajectory corresponding to the first time period includes the first movement,
  the executing of the first processing is performed when the gaze trajectory corresponding to the first time period includes the first movement, the first processing including displaying, on a screen of a display device, first gaze information indicating a first gaze trajectory, the first gaze trajectory being a gaze trajectory represented by first gaze points from among the plurality of gaze points, the first gaze points being one or more gaze points each of which is associated with a second time period within the first time period, the second time period being a time period from a time at which the first movement is started and being longer than a predetermined time length, and
  the executing of the second processing is performed when the first movement is not detected in any part of the gaze trajectory corresponding to the first time period, the second processing including displaying, on the screen, second gaze information indicating a second gaze trajectory, the second gaze trajectory being a gaze trajectory represented by second gaze points from among the plurality of gaze points, the second gaze points being one or more gaze points each of which is associated with a third time period within the first time period, the third time period being a time period having a predetermined time length and being less than the second time period.

* * * * *